United States Patent [19]

Netter et al.

[11] Patent Number: 4,489,745
[45] Date of Patent: Dec. 25, 1984

[54] FUEL TANK FOR USE IN A LOW-GRAVITY ENVIRONMENT

[75] Inventors: Gaston Netter, Lilienthal; Injas Widjaja, Stuhr, both of Fed. Rep. of Germany

[73] Assignee: Erno Raumfahrttechnik GmbH/MBB, Bremen, Fed. Rep. of Germany

[21] Appl. No.: 443,767

[22] Filed: Nov. 22, 1982

[30] Foreign Application Priority Data

Nov. 21, 1981 [DE] Fed. Rep. of Germany ....... 3146262

[51] Int. Cl.³ .............................................. B64G 1/00
[52] U.S. Cl. .................................. 137/209; 137/590; 137/574; 137/576
[58] Field of Search ................. 137/154, 574, 576, 590

[56] References Cited

U.S. PATENT DOCUMENTS

3,202,167  8/1965  De Young .................... 137/574 X
4,168,718  9/1979  Frosch ......................... 137/574 X
4,399,831  8/1983  Robert ........................... 137/154

Primary Examiner—Alan Cohan
Attorney, Agent, or Firm—Ralf H. Siegemund

[57] ABSTRACT

The fuel tank as disclosed is provided particularly for storage of aggressive fuel as they are used for and in control jets, attitude positioning systems in satellite and space vehicles. The fuel tank is of a spherical configuration and partitioned by a conical insert to obtain two spaces of different volumes. The small end of the cone faces the fuel outlet, opposite the driving gas inlet, and is constructed as a narrow mesh sieve. The fuel outlet is surrounded by a collection chamber likewise closed off by a narrow mesh sieve. The smaller one of the two chambers includes fuel lines which end in the corner space where the conical partition is affixed to the spherical tank and are closed likewise by sieves. The invention uses the strong surface tension forces of the fuel wetting the mesh to create a barrier against the passage of driving gas into the fuel line and outlet of the tank.

4 Claims, 2 Drawing Figures

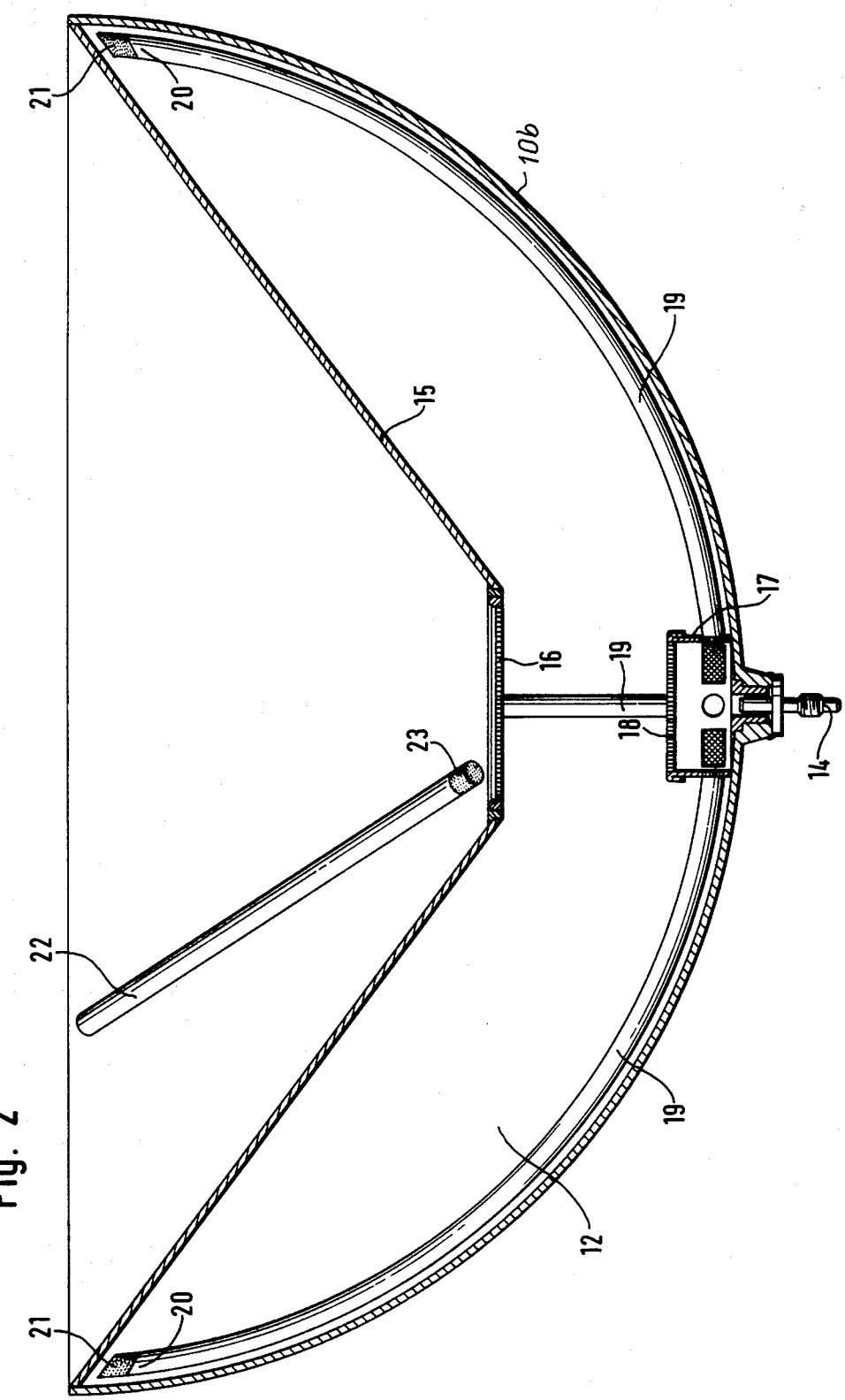

FUEL TANK FOR USE IN A LOW-GRAVITY ENVIRONMENT

BACKGROUND OF THE INVENTION

The present invention relates to a fuel tank having separate inlet and outlet connections and to be provided for storing aggressive liquids such as used for example in propulsion systems for space vehicles, satellites or the like. In particular the inventive fuel tank is to operate in a gravity free environment.

It is well-known that satellites when orbiting require a particular orientation relative to the earth. This orientation is usually needed so that the satellite can perform the desired tasks and, most importantly, can continue to communicate with ground stations. Therefore, it is known to provide satellite and orbiting space vehicles with attitude position and orientation controls which permit the correction and maintaining of particular positions in all directions of freedom of motion. Generally, one uses mini-propulsion systems and small jets for that purpose which provide very small but very accurately metered mechanical impulses so that the requisite control and corrective motion can be obtained.

The miniature or mini-propulsion systems and control jets in a space vehicle require a certain amount of fuel and, therefore, it is necessary to store such fuel in a suitable container within the satellite. The fuel used here are usually in the liquid state and are passed through a gas generator for immediate and direct ejection by and from the propulsion system. It is necessary to provide the fuel transfer from the tank to the propulsion system in a very accurate manner, and in particular it is necessary to limit the amount of fuel transferred to the exact amount that is needed for the generation of a particular pulse and moment. In particular, gas bubbles must not be included in the fuel. This requirement arises primarily because the transfer of the fuel from the tank requires by itself a propulsion or, better, driving gas. This driving gas must be carefully separated from the fuel proper as they must not mix. The liquid fuel and the driving gas may not physically blend, but the absence of gravity precludes natural stratification. It can readily be seen that in case of gas bubbles included in the fuel, the metered quantity may be faulty as to the precise amount of fuel provided for the propulsion system. For this reason, it has been proposed to divide the interior of the fuel tank by means of a synthetic membrane which separates a compartment containing the driving gas with certainty from the compartment containing the fuel proper. Such construction is workable in principle, but not necessarily in all specific instances.

A known and conventionally used single component fuel is for example, hydrazine. Decomposing hydrazine constitutes a very useful propulsion gas that can be used directly by the propulsion system for purposes of position and attitude control as mentioned above. Multi-component fuel is also known which type of fuel is often preferred because of a somewhat larger energy content, and for this reason multi-component fuel is more suitable, particularly in those cases in which the space vehicle cannot be refueled frequently (or not at all). However, it is a significant drawback of these multi-component fuels that at least some components are highly chemically aggressive. A typical example here is nitrogentetraoxide. The aggressiveness of this component renders impossible the utilization of synthetic membranes in the tank particularly when it is expected that the membrane may be exposed to this (or other) aggressive components for a long period of time.

In order to avoid the problem of chemical aggression, fuel tanks have been proposed which, for example, utilize the surface tension of liquid for purposes of transporting the liquid from the tank to the propulsion system. One still needs, however, a driving gas, and if the fuel is not physically separated from the driving gas there is still the danger that gas bubbles pass into and through the fuel and again the propulsion system will no longer be reliable.

DESCRIPTION OF THE INVENTION

It is a feature of the present invention to provide an impermeable barrier between a driving gas and fuel in a fuel tank for space vehicles, which barrier, however, does not depend on a flexible parition.

It is an object of the present invention to provide a new and improved fuel tank for liquid fuel to be discharged through an outlet, the tank having an inlet for gas driving the fuel into and through the outlet. The tank is to be constructed so that with certainty, the transfer of driving gas bubbles into the fuel line is prevented.

In accordance with the preferred embodiment of the present invention, the interior of the fuel tank is to be partitioned by means of a frusto-conical divider such that a larger and a smaller chamber is established, the inlet for the driving gas being provided in the larger chamber, the smaller chamber being provided with the fuel outlet; the frusto-conical partition has a small end which is constructed as or provided with a very close mesh sieve such that adhering liquid on account of surface tension does in fact close off the pores and apertures of the sieve. The invention makes use of a principle of physics that in the near gravity free environment in which the fuel tank is to be used the surface tension of liquids assumes significant magnitude and the forces underlying the surface tension are used directly to prevent the passage of gas bubbles through the sieve while the same forces are used to orient the fuel in a stable disposition within the tank.

The partitioning of the inventive fuel tanks into two chambers of different volume is quite in agreement with the usual requirement that the tank should hold the fuel for the so-called apogee manuever as well as the fuel for regular maneuvering (attitude control, etc.) of the satellite or space vehicle while orbiting. The content of the larger chamber is used for the apogee maneuver, which requires the larger quantities of fuel, whereby the apogee maneuver itself and here particularly, the resulting acceleration orients the fuel within the tank in a particular manner which is symmetrical to the conical partition. During this maneuver, the requisite fuel is forced by means of the driving gas through the sieve in the bottom of the cone and from there into a collection chamber surrounding the fuel outlet. During orbiting the fuel contained in the smaller chamber gathers with increasing consumption in an annular chamber (corner) portion between the wide portion of the cone and the adjacent outer wall of the fuel tank. Appropriately disposed fuel lines receive this fuel and the fuel moves under capillary forces into the aforementioned collection chamber. The collection chamber itself as well as the internal fuel line should also be closed off by means of close mesh sieves which perform the same blocking function as far as gas is concerned that was mentioned above.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 2 illustrates the lower part of that tank also in cross sectional view but on an enlarged scale for purposes of illustrating better some relevant details.

Proceeding now to the detailed description of the drawings, FIG. 1 illustrates a fuel tank and vessel 10 which is composed of two half spheres, 10a and 10b. A frusto-conical insert 15 is inserted and projects particularly into the half sphere 10b. Accordingly, the interior of the fuel tank 10 is subdivided or partitioned into a larger upper space or chamber 11 being bounded by the half sphere 10a and by the downwardly directed cone 15. The residual space between the cone 15 and the half sphere 10b is smaller and denoted with reference numeral 12. The cone partition 15 has a bottom 16 at the small end and that bottom portion 16 is constructed as a mesh or sieve with very small apertures. The two chambers 11 and 12 communicate through this sieve. The inlet nipple 13 for driving gas is provided on top of the half sphere 10a, i.e., it is located in the uppermost part of the space, cavity or chamber 11. Diametrically opposed thereto is provided the fuel exit line and connection 14, leading particularly to collection chamber 17, that chamber faces the perforated bottom 16 of the frusto-conical insert 15.

Figure 1:
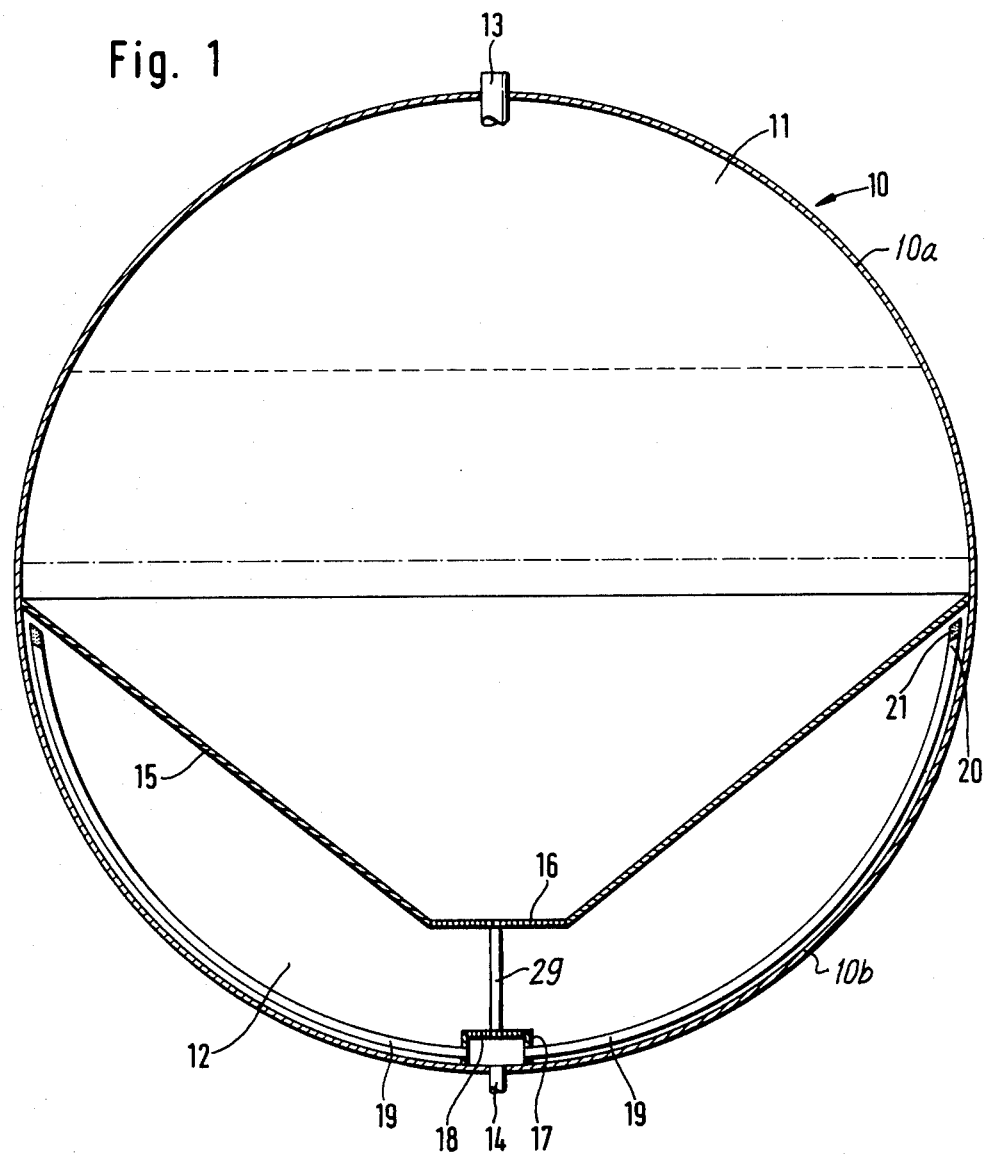
FIG. 1 is a cross section through a fuel tank constructed in accordance with the preferred embodiment of the present invention for practicing the best mode thereof.

The relatively small cylindrical collection chamber 17 is closed vis-a-vis the chamber 12 by a very small apertured sieve or mesh 18. A plurality of fuel lines 19 of arcuate configuration are connected to the cylindrical wall of the collection chamber 17. The free ends 20 of the fuel lines 19 are situated in the corner where the conical partition 15 is connected to the lower half sphere 10b which is at the equator of the sphere. Closed mesh or fine mesh sieves 21 are provided at these free ends 20 of the fuel lines 19. At least one venting tube 22 is provided, the inlet opening of which is located in the above mentioned corner. The outlet opening of the venting tube 22 sholl be located above the equatorial plane of the sphere. Mesh sieves 23 prevent gas bubbles entering the lower compartment.

The several sieves as described and referred to above are constructed such that the openings or perforations are so small that as long as they are wetted by the liquid fuel, the wetting of the perforation boundaries, close off the perforations completely. Thus, gas will not pass through them. Therefore, one uses the surface tension of the fuel in order to provide gas barriers at one end in each instance of the tubes such as 19,22 and 29, because the meshes or sieves 16, 18, 21 and 23 fulfill the same function. This way, one is sure that gas will not pass into the collection chamber 14, and therefore the fuel discharged from the tank through the connection in line 14 is indeed bubble free.

It can readily be seen, that during an apogee maneuver, some accelleration forces act in the direction given by the line through outlet 13 and outlet 14. The frusto-conical partition 15, being symmetrically oriented thereto, stabilizes the fuel in rotational symmetry to that line being the cone's axis. Driving gas will propell directly any fuel towards collection chamber 17, but sieves 16 and 18 prevent any gas bubbles from entering fuel line 14. In the case of complete absence of accelleration and gravity, fuel tends to gather in the corners where lines 19 end, and capillary forces in those lines will cause fuel to flow to chamber 17, whereby sieve 21 prevents the transport of gas bubbles.

The tank and its interior components can be made of any material depending on the kind of fuel being stored. In those cases in which the fuel or the component of the fuel is chemically aggressive, one may use titanium sheet for the tank and the sieves may be constructed from a chromium-nickel steel alloy. Therefore, the tank can indeed be used for storing two-component fuel, such as they are, to be used with advantage in control operations for satellites as was described in the introduction.

The invention is not limited to the embodiments described above; but all changes and modifications thereof, not constituting departures from the spirit and scope of the invention, are intended to be included.

We claim:

1. Fuel tank for use in a satellite space vehicle or the like, i.e., for operation under low or zero gravity conditions and having a main vessel with a driving gas inlet and an opposite disposed fuel outlet, the improvement comprising:

a frusto-conical insert partitioning the vessel into a larger chamber directly communicating with the drive gas inlet and a smaller chamber communicating with the fuel outlet;

the frusto-conical partition having a small end portion constructed as a narrow, close mesh sieve, being situated close to said fuel outlet, said chambers communicating through said sieve so that fuel from the large chamber under pressure from a driving gas can be forced through the sieve into the smaller chamber for subsequent discharge through the fuel outlet;

a cylindrical collection chamber in said tank surrounding said fuel outlet and including also a narrow close mesh sieve close to said sieve of said partition; and at least one internal fuel line in said smaller chamber and connected to said collection chamber and extending with its free end towards an area in between the wide portion of the conical insert and said vessel proper.

2. Fuel tank as in claim 1 and including at least one venting pipe having one end disposed adjacent said sieve, said end of said venting pipe being also closed by a close mesh sieve.

3. A fuel tank for use in a gravity free environment comprising:

a spherical hollow body having at one point a gas inlet and on a point opposite said gas inlet, a fuel outlet;

a frusto-conical partition within said sphere, partitioning the sphere into a larger and a smaller chamber and having its wide end affixed to at least approximately the equator of the sphere and in rotational symmetry to a line that extends from said gas inlet to said fuel outlet the gas inlet being in the large chamber, the outlet being in the smaller chamber;

said frusto-conical partition having a bottom portion constructed as a narrow and close mesh sieve, said frusto-conical partition having a bottom portion constructed as a narrow and close mesh sieve, said frusto-conical partition being oriented so that the said sieve is closer to the fuel outlet than to the gas inlet;

a collection chamber including a closed, narrow mesh sieve portion surrounding said fuel outlet;

a small tube extending between said sieve of said frusto-conical partition and the sieve of said collection chamber;

a plurality of arcuate fuel lines in the smaller chamber and extending from said collection chamber towards a corner region where the conical partition is affixed to the spherical tank, said fuel lines being closed by a narrow mesh sieve at said area.

4. A fuel tank as in claim 3 including venting pipes having a portion extending close to said sieve, said portion being closed by a narrow mesh sieve.

* * * * *